United States Patent [19]

Branson

[11] Patent Number: 4,536,096

[45] Date of Patent: Aug. 20, 1985

[54] PRINT HEAD CARRIAGE MECHANISM INCLUDING A DRIVE BELT

[76] Inventor: Terry L. Branson, 1258 Gainsborough, Sunnyvale, Calif. 94087

[21] Appl. No.: 106,445

[22] Filed: Dec. 26, 1979

[51] Int. Cl.[3] .......................... B41J 3/02; G01D 15/10

[52] U.S. Cl. .................................... 400/120; 400/175; 400/320; 400/705.1; 346/139 R

[58] Field of Search ............... 400/118, 119, 120, 121, 400/124, 126, 320, 322, 323, 175, 705.1; 346/139 R, 139 A, 139 B, 139 C, 150, 151, 155, 162, 163; 101/93.05, 93.16

[56] References Cited

U.S. PATENT DOCUMENTS

| | | | |
|---|---|---|---|
| 2,938,455 | 5/1960 | Jurgens et al. | 101/93.05 |
| 3,236,351 | 2/1966 | Fitch et al. | 400/323 |
| 3,340,541 | 9/1967 | Klassen et al. | 346/139 B |
| 3,496,547 | 2/1970 | Gorrill et al. | 101/93.16 X |
| 3,683,411 | 8/1972 | Ikeda | 346/139 R |
| 3,810,189 | 5/1974 | Casperson et al. | 400/320 X |
| 3,907,090 | 9/1975 | Northfield et al. | 400/120 |
| 3,960,255 | 6/1976 | Bisson et al. | 400/120 |
| 3,989,131 | 11/1976 | Knirsch et al. | 400/120 |
| 4,149,810 | 4/1979 | Cassier | 400/320 |
| 4,239,403 | 12/1980 | Matula et al. | 400/322 |

FOREIGN PATENT DOCUMENTS

| | | | |
|---|---|---|---|
| 2550020 | 12/1977 | Fed. Rep. of Germany | 400/320 |

*Primary Examiner*—Ernest T. Wright, Jr.

[57] ABSTRACT

A print head carriage assembly is provided which is especially suitable for use in a thermal dot matrix character printer. The assembly includes a belt, which in one embodiment is formed of laminations of film. The belt is formed into a loop with a free end by a tensioning device; the belt loop tautly passes around a pair of guides, one of which is bidirectionally rotatable to transport a print head clipped to the loop between the two guides and across a platen. The control signals to the print head are passed via conductors affixed to the belt from the free end of the belt to the print head.

3 Claims, 4 Drawing Figures

FIG. 4
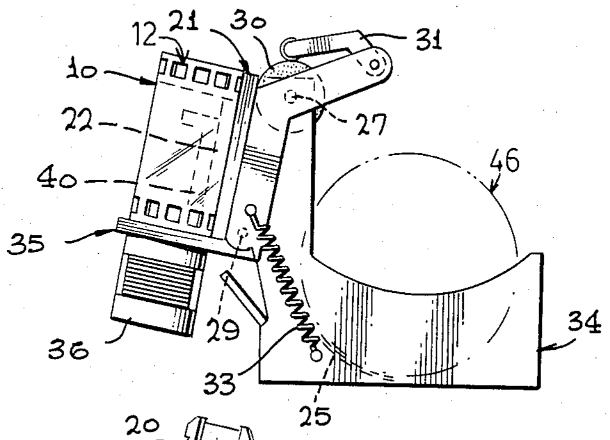
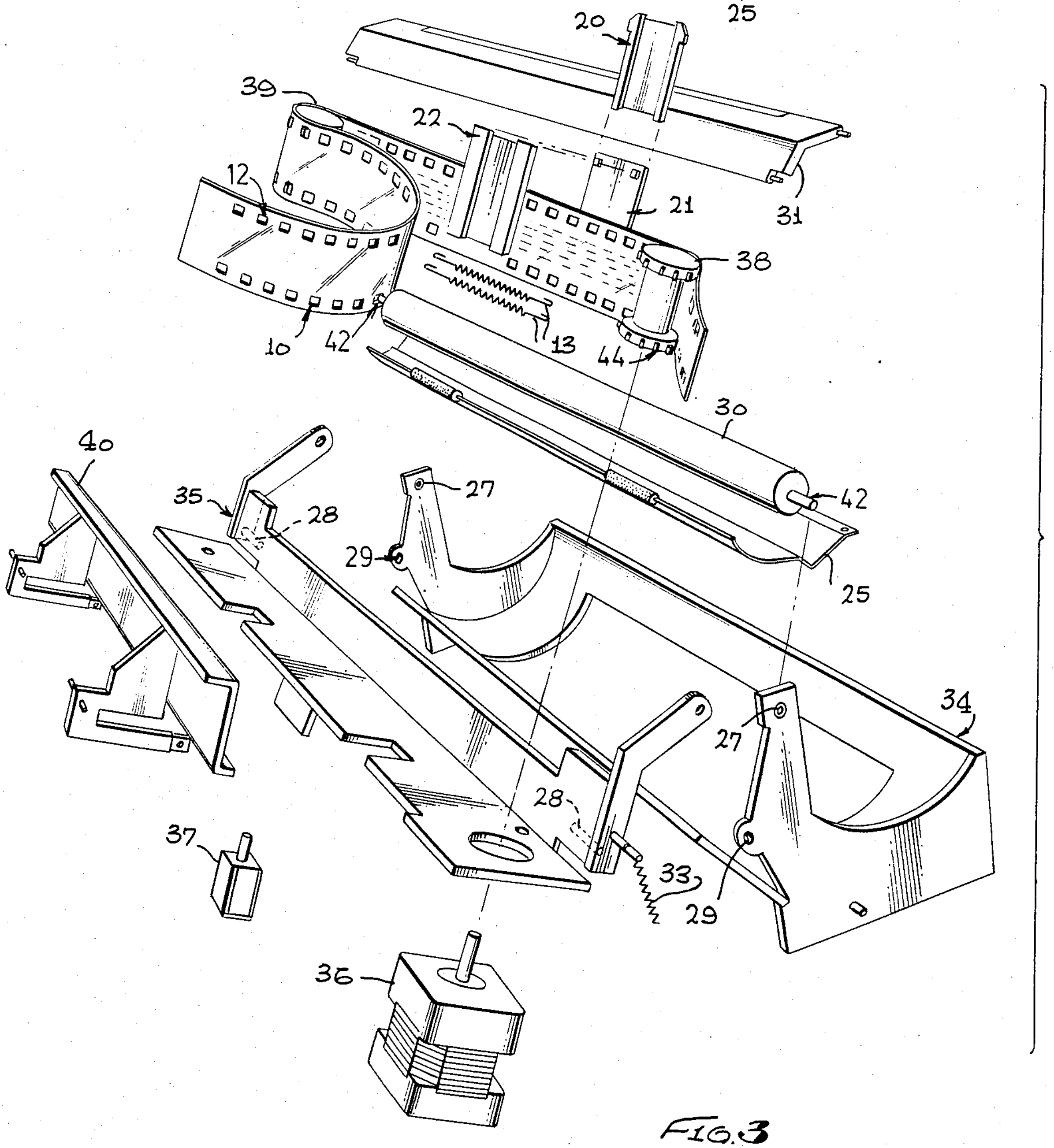
FIG. 3

PRINT HEAD CARRIAGE MECHANISM INCLUDING A DRIVE BELT

BACKGROUND OF THE INVENTION

1. Field of the Invention

This disclosure relates to an apparatus for transporting a print head across a platen and for providing signals to the print head to generate characters.

2. Description of Prior Art

Computer systems are becoming significantly less expensive, making them cost effective for an increasing range of applications. Formerly, the primary cost of a computer system was attributable to the electronic circuitry required to provide the processing capabilities. The cost of peripherals, such as printers, mass storage units, CRT terminals, modems, etc. and the cost of software were minor when compared to the cost of the central processing unit. However, the recent advances in semiconductor electronics have caused a precipitous decline in the cost of processing logic, with the result that computer systems are now suitable for use in new markets.

The major costs of present day computer systems are in the cost of peripherals and software. Software packages, if able to be marketed as a standard product not requiring major changes for each customer, may be sold at a low cost since the cost of development of the software is distributed among many customers. Computer peripherals, however, cannot achieve similar reductions in cost. Although the marginal cost to install an additional copy of an existing software package is very low, the marginal cost to manufacture a computer peripheral is considerable. Computer peripherals are typically a hybrid between mechanical and electrical engineering technologies. The mechanical aspects of a peripheral, such as precision-formed components, and the cost of assembly, have been fundamental limitations on the cost of such peripherals. Nevertheless, considerable research is being performed to develop less expensive computer peripherals.

Commercially available computer printer peripherals range from typewriter-based devices printing 10 or 15 characters per second to laser-based printers able to print many pages per second. Computer printers can be divided into three fundamental classes:

(1) Character printers, such as computer-driven typewriters, where each character is individually formed or printed;

(2) Line printers, wherein an entire line of print is assembled simultaneously, e.g. by providing a drum rotating before a sheet of paper in which at each print position there is a corresponding segment around the drum containing a print element for each printable character; and (3) Page printers, such as laser-based printers or xerographic printers, which form an entire page of print at one time.

The most inexpensive type of printer is the character printer. Such printers have been used for many years as typewriters and in such applications as telegraphy. One of the least expensive of the character printers is the thermal dot matrix printer.

A thermal dot matrix printer requires a special paper, which may be selectively discolored by application of heat. The thermal print head contains several wire elements, each of which may be heated as desired. The print head is moved across the paper in a straight line and the wire elements are controllably heated to form the desired characters on the sensitized coating on the paper. Typically, there may be 7 wire elements in a thermal print head, thereby allowing 7 rows of "dots" to be formed as the print head is drawn across the paper. The print head is controlled so that each wire element may be turned on or turned off at, for example, five discrete positions for each character position in the print line. In this manner, the interaction of the 7 rows of print head elements with the 5 potential columns in a character position form a $5 \times 7$ matrix of positions in which dots may be selectively formed by the print head to create the desired character. Such thermal dot matrix printers are used where an especially inexpensive printer is desired and a slower print rate, lower quality printing, and requirement for sensitized paper are acceptable trade offs when compared to the low cost of the printer.

A major mechanical assembly of such a printer is the carriage assembly, which moves the print head across a paper under control of logic circuitry. Such circuitry also controls the heating of the print head wire elements. The carriage assembly has several requirements. First, it must permit the head to move bi-directionally, i.e. back and forth across the paper. Second, the carriage mechanism must accurately locate the print head during its movement across the paper so that predictably uniform characters may be formed. Third, the carriage mechanism should allow the print head to be easily removed and replaced inasmuch as individual wire elements in the print head tend to "burn out". Fourth, the carriage mechanism must allow the paper to be inserted between the print head and platen in a convenient manner.

There have been several approaches to the design of thermal dot matrix printer carriage assemblies. Certain of such assemblies have been provided with a lead screw which is threaded through a portion of the carriage assembly. The screw is fixed with respect to the carriage assembly and extends in front of the platen. By appropriate rotation of the screw, the carriage assembly is transported across the line to be printed. Additional guides for the carriage assembly are typically required in order to insure that the movement of the carriage assembly is precisely performed and that the print head remains in the desired alignment with the platen.

Another approach to the design of thermal dot matrix printers has been to provide a carriage assembly slidable on guide shafts, the shafts determining the alignment of the print head with respect to the platen. The assembly is moved via a flexible wire cable which is pulled via a motor. By appropriate cabling, the carriage can be moved back and forth in a precision manner.

Unfortunately, these two approaches to thermal dot matrix printers, and other such approaches in the prior art, have suffered from several limitations. For instance, auxiliary guide shafts are typically required to insure that the print head maintains a precise position with respect to the platen as it moves across it, and to insure that the print head has no "wobble" or other undesirable mechanical imprecisions in its movement. All such guide mechanisms contribute to the cost of the printer. Additionally, such parts must be precision formed, resulting in increased costs to manufacture them.

Inasmuch as any increase in mass of the carriage assembly which moves with the print head requires a more powerful, and therefore more expensive, drive motor than would be required for a lighter carriage assembly, any reduction in mass of the carriage assembly results in cost savings in other areas of the printer assembly also.

Accordingly, it is a primary object of the herein disclosed invention to provide a thermal print head carriage assembly which precisely positions the print head with respect to the platen as it is transported across the platen. An additional object is to provide for a carriage assembly which allows the print head to be easily removed for repair or replacement, and allows for the easy insertion of paper in the printer. It is also an object to provide a light, simple, inexpensive carriage assembly and drive mechanism.

SUMMARY OF THE INVENTION

These and other objects of the invention are provided by a thin flexible belt formed into a loop with a free end or tail. The loop passes around several belt guides and is tautly positioned around them by a tensioning device. The print head is clipped to the loop and is electronically controlled via electrical conductors affixed to the belt and running from the free end of the belt to the print head. In addition, the belt may contain sprocket holes to aid in the controlled movement of the print head. In order to insure that the print head properly contacts the paper, a head guide positioned inside the loop may appropriately bias the print head against the paper.

The belt may contain position related codes for use with a print head position determining device. For instance the sprocket holes may be counted via an appropriate device to determine the current position of the print head.

BRIEF DESCRIPTION OF THE DRAWING

FIG. 3 is an exploded perspective view of a mechanical printer assembly utilizing the belt and print head clip illustrated in FIGS. 1 and 2.

FIG. 4 is a side view of the printer assembly of FIG. 3 in which the carriage assembly frame is positioned to bias the print head against the platen.

DETAILED DESCRIPTION OF THE PREFERRED EMBODIMENTS

Figure 1:
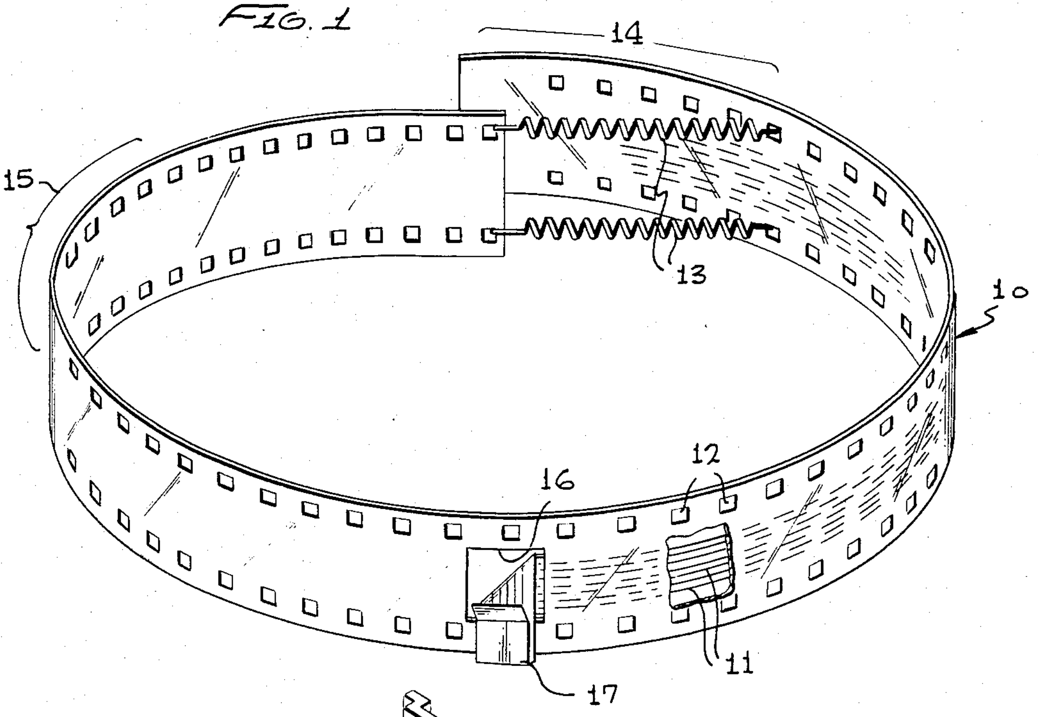
FIG. 1 is a perspective view of a belt suitable for positioning and electrically controlling a print head in accordance with an embodiment of the present invention.

FIG. 1 illustrates an embodiment of a print head drive belt 10 able to be utilized in the present invention. The belt 10 typically has the shape of an elongated, flexible ribbon which is relatively thin. Since the belt 10 will be a primary factor in determining the precision of the print head position alignment, it is necessary that it be a mechanically stable medium having little elasticity. Although many materials satisfy these requirements, it has been found that laminations of polymeric film inexpensively satisfy the basic mechanical properties necessary. Any of a variety of polymeric films may be appropriately utilized, e.g., polyamide films such as that sold under the trademark "Kapton", polyamide films such as nylon, or polyester films such as "Mylar". The appropriateness of each of these types of films indicate the wide range of films able to be utilized in the present invention, and therefore, the invention should not be limited to the use of the enumerated films, but it should be understood that the teachings of the invention encompass a belt 10 formed of any material which provides the stable mechanical properties necessary to precisely align the print head 20 with respect to a platen 30.

The belt 10 is formed into a loop 15 with a tail or free end 14 by a tension means 13. The tension means 13 engages one end of the belt 10 and a middle portion of the belt 10 to form the loop 15 and to urge the loop 15 to a specified perimeter length. In one embodiment of the invention, the tension means 13 comprises coil springs which suitably engage an end and middle section of the belt 10. Alternative tension means would include any elastic material, or any other such means for urging the loop 15 to the desired perimeter length, which allows the loop 15 to be slightly elastic in length.

The belt 10 also provides support for one or more electrical conductors 11. These conductors 11 typically extend from the free end 14 of the belt 10 to the area of the belt 10 to which the print head 20 will be attached. In one embodiment, the belt 10 comprises laminations of polymeric films, i.e., insulators. The electrical conductors 11 may be interposed between the laminations, and a window 16 may be cut in the laminations to allow the electrical conductors 11 to contact the print head 20. The chief advantage to uniting the electrical conductors 11 with the belt 10 is that the conductors 11 are suitably protected from contact with other portions of the printer or from the operator. There is little possibility that an operator or user of a printer using such a belt 10 would be able to interfere with or be subject to the risk of shock from electrial conductors 11 which are so protected.

The belt 10 may also include means for insuring the precise movement of the belt 10, such as sprocket holes 12. The sprocket holes 12 engage sprockets 44, as described below. An additional advantage to such sprocket holes 12 is that they may serve a dual purpose as a means for determining the current position of the belt 10. By appropriate counting of the number of sprocket holes 12 which have passed a fixed reference point, the current position of the belt 10 may be determined.

Figure 2:
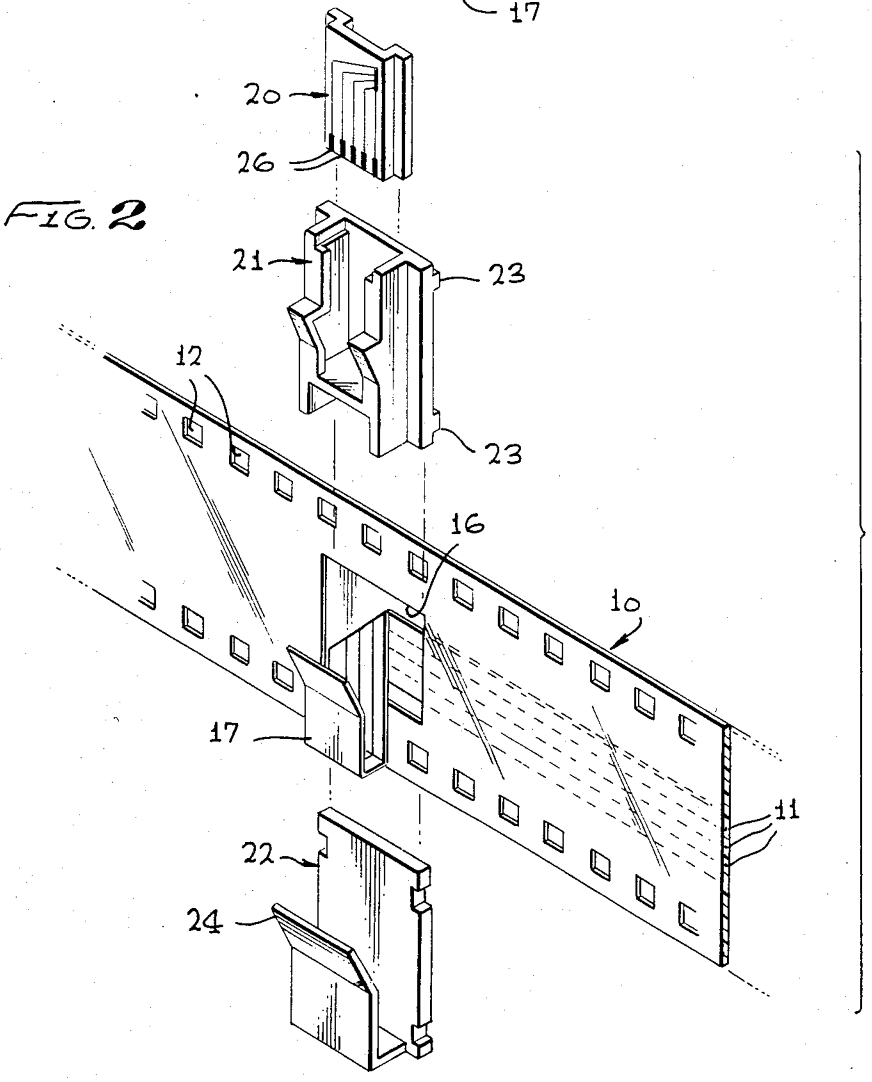
FIG. 2 is an exploded perspective view of the belt and print head clip apparatus in accordance with an embodiment of the invention.

FIG. 2 illustrates one method for attaching a print head 20 to the belt 10. The print head 20 may contain one or more electrical contacts 26 to allow easy electrical connection to be made to the print head 20. As previously indicated, in one embodiment, the electrical conductors 11 may be positioned between two laminations of flexible film. At the point of attachment of the print head 20 to the belt 10, an aperture 16 may be formed in a lamination to allow access to the electrical conductors 11 and to permit the desired electrical connections to be made to the print head 20. The exposed end 17 of the electrical conductors 11 comes into electrical contact with the contacts 26 of the print head 20 when the print head 20 is clipped to the belt 10.

A print head retainer 21 and rear print head retainer 22 may be provided to clip the print head 20 to the belt 10. The head retainer 21 may contain protrusions 23 to engage the sprocket holes 12 in the belt 10, thereby fixing the position of the print head 20 on the belt 10. A finger grip 24 may be provided on the rear print head retainer 22 to allow for the easy removal of the head retainer 21 and associated print head 20 from the belt 10 when desired. Such a feature is advantageous since thermal print heads need regular replacement.

Although FIG. 2 illustrates one embodiment of a clip for attaching a print head 20 to the inventive belt 10, the invention should not be limited to the embodiment illustrated inasmuch as it is obvious to one skilled in the art that a variety of mechanical assemblies would permit the suitable attachment of the print head 20 to the belt 10.

FIG. 3 is an exploded perspective view of a printer according to the teachings of the herein disclosed invention, and FIG. 4 is a side view of the same printer. The printer frame 34 contains a pair of bearings 27 into which the shaft 42 of a platen 30 maybe inserted. A lower paper guide 25 serves to guide the free end of a roll of paper 46 to the platen 30. A pivotable carriage assembly frame 35 has a pair of protruding shafts 28, each shaft 28 fitting into a corresponding bearing 29 mounted in the printer frame 34. A overcenter bias spring 33 on each side of the carrier assembly frame 35 serves to hold the carriage assembly frame 35 in either of two stable postions. The first position, illustrated in FIG. 4, holds the belt 10 and attached print head 20 against the platen 30. Alternatively the carriage frame assembly 35 may be pivoted about the bearings 29 to separate the belt 10 and print head 20 from the platen 30, allowing easy insertion and removal of paper 46 from the platen 30.

Also attached to the carriage frame assembly 35 is an upper paper bail 31 which holds the paper 46 against the platen 30 above the line to be printed. Two belt guides 38, 39 are attached to the carriage frame assembly 35. As illustrated, these belt guides 38, 39 may contain sprockets 44 to suitably engage the belt 10. A drive motor 36 is attached to belt guide 38. This motor 36 may rotate in either direction, causing the print head 20 to be transported between the two belt guides 38, 39 and across the platen 30. As the print head 20 is transported across the platen 30, suitable signals to the print head 20 may be sent along the electrical conductors 11 (not illustrated in FIG. 3) to form a line of print.

In order to assist the biasing of the print head 20 against the platen 30, a print head guide 40 may be attached to the carriage assembly frame 35. This print head guide 40 is mounted within the loop 15 formed by the belt 10 around the two belt guides 38,39. The rear of the rear print head retainer 22 contacts this head guide 40 and insures that the print head 20 remains in contact with the platen 30 as it is transported between the belt guides 38, 39.

In order to determine the current position of the print head 20 with respect to the platen 30, a sensor 37 for determining the rotational position of the belt 10 may be attached to the carriage frame 35 so as to come into proximity with a portion of the belt 10. In one embodiment, the sensor 37 detects the passage of the belt's sprocket holes 12 and provides an appropriate signal to a an up/down counter circuit (not shown) to allow determination of the print head's position. If a finer gradation of print head movement is desired, more closely spaced position flags may be provided on the belt 10 to allow sensing of finer gradation of movement.

While only a limited number of embodiments of the disclosed invention have been discussed herein, it will be readily apparent to persons skilled in the art that certain changes and modifications may be made without departing from the spirit of the invention. Accordingly, the foregoing disclosure, description and figures are for illustrative purposes only, and do not in any way limit the invention, which is defined only by the claims.

I claim:

1. A print head carriage apparatus for use in a character printer comprising:

a platen;

first and second rotatable belt guides attached to said printer;

belt means, looped around said belt guides, for supporting and transporting a print head between said belt guides and for precisely aligning said print head with respect to said platen;

drive means, engaging said first belt guide, for rotating said first belt guide to move said belt, thereby transporting said print head between said belt guides;

at least one electrical conductor, united with said belt means, for conveying signals along said belt means to said print heads; and retainer clip means for detachably securing said print head to said belt means.

2. A character printer comprising:

a main frame;

a platen attached to said main frame for supporting a sheet of paper along a line to be printed;

carriage frame pivotally attached to said main frame and movable between a first and second position;

first and second belt guides rotatably attached to said carriage frame;

drive means for controllably rotating said first belt guide;

a print head;

belt means, tautly looped around said first and second belt guides and having said print head secured to said belt means, for supporting and moving said print head between said first and second belt guides as said drive means rotates said first belt guide and for precisely aligning said print head with respect to said platen; and at least one electrical conductor, united with said belt means, for conveying signals along said belt means to said print head.

3. An apparatus according to claim 2 further comprising a print head guide, affixed to said carriage frame and protruding inside said belt means loop, to bias said print head against said platen when said carriage frame is in said first position.

* * * * *